United States Patent [19]
Georgiou et al.

[11] Patent Number: 6,047,248
[45] Date of Patent: Apr. 4, 2000

[54] PERFORMANCE-TEMPERATURE OPTIMIZATION BY COOPERATIVELY VARYING THE VOLTAGE AND FREQUENCY OF A CIRCUIT

[75] Inventors: Christos John Georgiou, White Plains; Edward Scott Kirkpatrick, Croton-on-Hudson; Thor Arne Larsen, Hopewell Junction, all of N.Y.

[73] Assignee: International Business Machines Corporation, Armonk, N.Y.

[21] Appl. No.: 09/226,097

[22] Filed: Oct. 19, 1998

Related U.S. Application Data

[63] Continuation of application No. 08/639,586, Apr. 29, 1996, Pat. No. 5,940,785.

[51] Int. Cl.$^7$ .................................................. G05D 23/00
[52] U.S. Cl. ........................... 702/132; 713/322; 713/324
[58] Field of Search ............................ 702/132; 713/320, 713/322, 323, 324, 330; 327/513

[56] References Cited

U.S. PATENT DOCUMENTS

| | | | |
|---|---|---|---|
| 5,162,668 | 11/1992 | Chen et al. | 307/296.8 |
| 5,189,314 | 2/1993 | Georgiou et al. | 307/271 |
| 5,287,292 | 2/1994 | Kenny et al. | 364/550 |
| 5,291,607 | 3/1994 | Ristic et al. | 395/750 |
| 5,367,638 | 11/1994 | Niessen et al. | 395/250 |
| 5,422,806 | 6/1995 | Chen et al. | 364/149 |
| 5,422,832 | 6/1995 | Moyal | 364/557 |
| 5,451,892 | 9/1995 | Bailey | 327/113 |
| 5,453,705 | 9/1995 | Atallah et al. | 326/86 |
| 5,465,373 | 11/1995 | Kahle et al. | 395/800 |
| 5,481,210 | 1/1996 | Genzel | 326/93 |
| 5,483,102 | 1/1996 | Neal et al. | 257/712 |
| 5,485,127 | 1/1996 | Bertoluzzi et al. | 331/69 |
| 5,490,059 | 2/1996 | Mahalingaiah et al. | 364/166 |
| 5,502,838 | 3/1996 | Kikinis | 395/550 |
| 5,504,908 | 4/1996 | Ikeda | 395/750 |
| 5,513,361 | 4/1996 | Young | 395/750 |
| 5,563,928 | 10/1996 | Rostoker et al. | 377/20 |

(List continued on next page.)

FOREIGN PATENT DOCUMENTS

| | | | |
|---|---|---|---|
| 0 549 052 A2 | 12/1992 | European Pat. Off. | G06F 5/06 |
| 0 549 052 B1 | 12/1992 | European Pat. Off. | G06F 5/06 |
| 0 631 220 A2 | 5/1994 | European Pat. Off. | G05D 23/20 |
| 0683558A1 | 11/1995 | European Pat. Off. | H02H 5/04 |

OTHER PUBLICATIONS

Mike Johnson, Advanced Micro Devices, "Superscalar Microprocessor Design", PTR Prentice Hall, Inc., pp. 44–48 and 127–146, 1991.

(List continued on next page.)

*Primary Examiner*—Patrick Assouad
*Attorney, Agent, or Firm*—Scully, Scott, Murphy & Presser; Wayne L. Ellenbogen, Esq.

[57] ABSTRACT

A system and method using thermal feedback to cooperatively vary a voltage and frequency of a circuit to control heating while maintaining synchronization. Preferably, on-chip thermal sensors are used for feedback. A system having features of the invention includes: a thermal sensor coupled to the circuit, the thermal sensor generating a temperature signal which is a function of a temperature associated with the functional unit; a temperature decoder having an input and an output, the input coupled to the thermal sensor for decoding the temperature signal; a comparator having one input coupled to the decoder for comparing a decoded temperature signal with a predetermined temperature threshold signal coupled to a second input, the comparator enabling a voltage/clock control signal as a function of the decoded temperature signal and the predetermined temperature threshold; an adjustable voltage regulator coupled to the voltage/clock control signal; and a clock selector coupled to the voltage/clock control signal; wherein the voltage regulator and the clock selector are adapted to cooperatively vary the voltage and the frequency of the circuit to a predetermined voltage-frequency pair, responsive to the voltage/clock control signal.

2 Claims, 6 Drawing Sheets

U.S. PATENT DOCUMENTS

| | | | |
|---|---|---|---|
| 5,574,667 | 11/1996 | Dinh et al. | 364/557 |
| 5,631,852 | 5/1997 | Chen | 364/557 |
| 5,642,388 | 6/1997 | Evoy | 375/376 |
| 5,721,837 | 2/1998 | Kikinis et al. | 395/281 |
| 5,745,375 | 4/1998 | Reinhardt et al. | 364/492 |
| 5,798,667 | 8/1998 | Herbert | 327/513 |
| 5,798,918 | 8/1998 | Georgiou et al. | 364/148 |

OTHER PUBLICATIONS

C. K. Moore, "Power Management Sleep–Mode Control for Microprocessors", IBM Technical Disclosure Bulletin, vol. 36, No. 8, pp. 189–190, Aug. 1993.

S. R. Boyle et al., "A CMOS Circuit for Real–Time Chip Temperature Measurement", IEEE, 1063–6390/94, pp. 286–291, 1994.

S. Mutoh et al., "1–V Power Supply High–Speed Digital Circuit Technology with Multithreshold–Voltage CMOS", IEEE Journal of Solid–State Circuits, vol. 30, No. 8, pp. 847–854, Aug. 1995.

K. Shimohigashi et al., "Low–Voltage ULSI Design", IEEE Journal of Solid–State Circuits, vol. 28, No. 4, pp. 408–413, Apr. 1993.

L. S. Nielsen et al., "Low–Power Operation Using Self–Timed Circuits and Adaptive Scaling of the Supply Voltage", IEEE Transactions on Very Large Scale Integration (VLSI) System, vol. 2, No. 4, pp. 391–397, Dec. 1994.

P. Macken et al., Session 15. Innovative Circuit Design, FPM 15.2: "A Voltage Reduction Technique for Digital Systems", 1990 IEEE International Solid–State Circuits Conference Digest of Technical Papers, First Edition, pp. 238–239, Feb. 16, 1990.

M. Izumikawa et al., "WP 5.4: A 0.9V 100 MHz 4mW 2 $mm^2$ 16b DSP Core", Digest of Technical Papers, 1995 IEEE International Solid–State Circuits Conference, pp. 84–85, 1995.

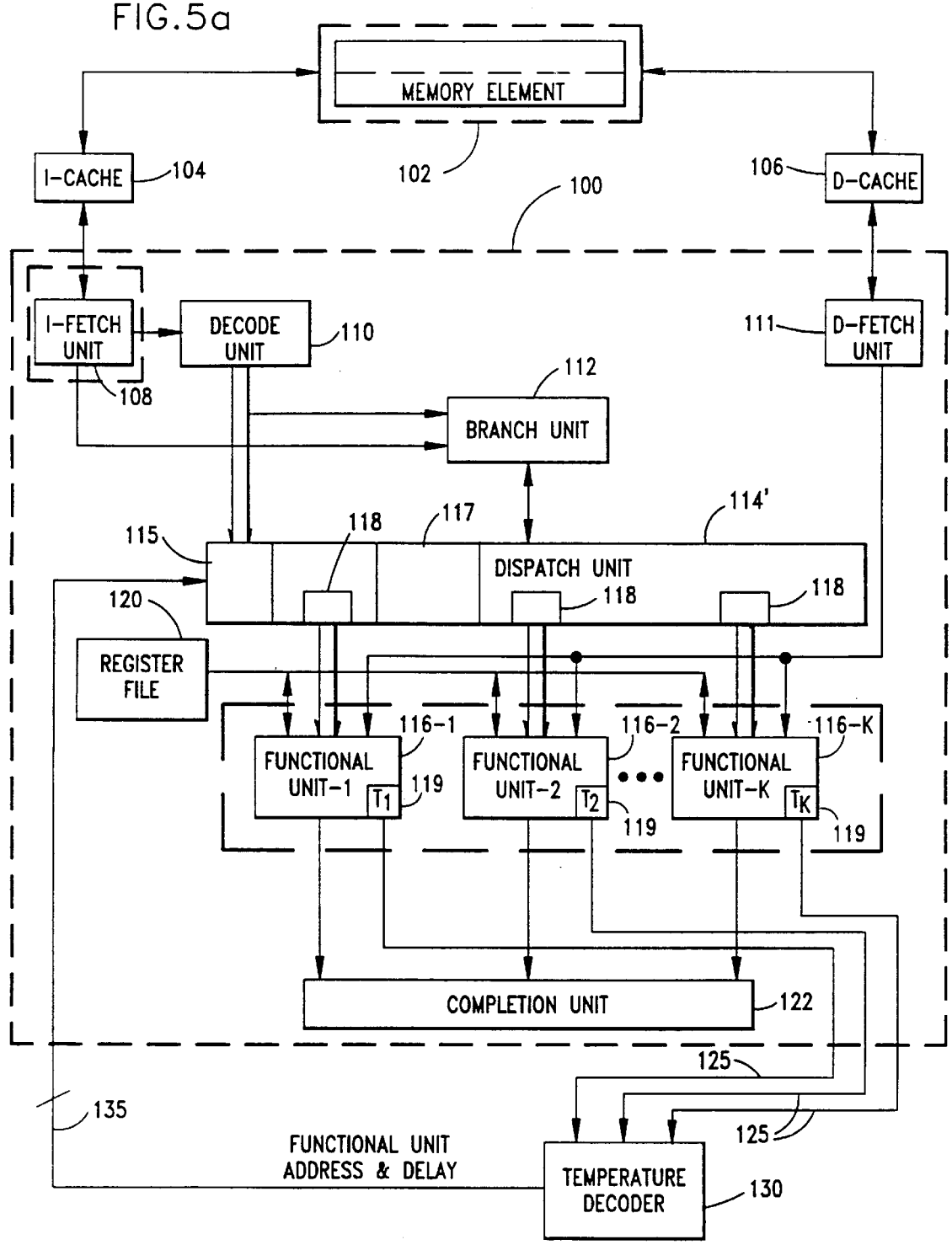

US 6,047,248

PERFORMANCE-TEMPERATURE OPTIMIZATION BY COOPERATIVELY VARYING THE VOLTAGE AND FREQUENCY OF A CIRCUIT

CROSS-REFERENCE TO RELATED APPLICATIONS

This application is a continuation of application Ser. No. 08/639,586 filed Apr. 29, 1996, now U.S. Pat. No. 5,940,785. The present invention is related to United States patent application Ser. No. 08/639,396 entitled "Performance-Temperature Optimization by Modulating the Switching Factor of a Circuit, IBM docket number YO996-024 filed of even date herewith by the inventors hereof and assigned to the same assignee herein, and incorporated herein by reference in its entirety.

FIELD OF THE INVENTION

This invention relates in general to an improved data processing system and in particular to a thermal feedback system and method for cooperatively varying the voltage and operating frequency of a synchronous circuit to control heating. Still more particularly to a thermal feedback system and method for cooperatively varying the voltage and operating frequency of a functional unit in a single or multi-functional unit processor to control heating.

BACKGROUND

Multi-functional unit processing offers well known parallel processing advantages. Unfortunately, the increased power dissipation imposed on the sinale substrate and package is a serious limitation. Generally, in CMOS VLSI circuits, most of the power dissipated is a result of the energy required to charge and discharge the load and internal capacitances on any internal and external circuits. Excessive temperatures at semiconductor device junctions can cause device and/or circuit malfunctions/failures, reduce circuit performance, and cause circuit interconnect and/or package failure. Increases in temperature tend to increase a signal's propagation delay through a circuit. Changes in propagation delays can cause undesired transients and/or synchronization problems in the case of critical timing paths in CMOS and similar circuits.

One approach to reducing the power dissipation of a circuit is to reduce the voltage swing at its outputs. CMOS and similar circuits will function correctly over a significant range of supply voltage. Reducing the voltage, however, also tends to increase a signal's propagation delay and may cause synchronization and reliability problems. For example, a digital chip is typically characterized by a critical timing path. Reducing the supply voltage will cause the propagation of a signal through the critical timing path to slow until a malfunction occurs.

Another approach to controlling power dissipation uses temperature feedback to control the clock frequency of a circuit. The frequency-based approach reduces the power dissipated by the clock circuit itself and for a synchronous circuit during the fraction of cycles that the circuits inputs are addressed.

The particular thermal feedback mechanisms used in the prior art vary. The temperature feedback mechanism could be on-chip or mounted in close proximity to a potentially hot chip, usually by means of a thermocouple on the package or case.

Another frequency-based approach does not use direct temperature feedback. Instead, a piecewise estimate of temperature change is determined as a function of time and clock frequency including temperature limits. A measured operating frequency and elapsed time is correlated to the piecewise estimate and the operating frequency is throttled between the temperature limits.

Regardless of the particular feedback mechanism used, one concern that arises in any frequency-based approach is that varying the clock frequencies to different portions of a chip may cause synchronization problems. In addition, the frequency-based approach is optimal only for the subset of clock cycles when a given circuit's inputs are addressed.

Thus, there is need for an improved thermal feedback system and method for controlling the power dissipation of a synchronous circuit while maintaining synchronization and reliability. The present invention addresses such a need.

SUMMARY

The present invention, in accordance with the aforementioned needs, is directed to a voltage and frequency based system and method for thermal control of a circuit. Using thermal sensors for feedback, the voltage swing and operating frequency of the circuit are cooperatively varied (also called voltage-frequency pairs) to reduce the power dissipation without compromising reliability or system synchronization. Reducing the voltage swing at the outputs of the circuit advantageously reduces power dissipation by a factor of the voltage squared. The circuit's clock frequency is correspondingly varied with the voltage to maintain critical timing paths within specifications. Thus, synchronization and reliability issues are avoided. A voltage based thermal control system having features of the present invention includes: a thermal sensor coupled to the circuit, the thermal sensor generating a temperature signal which is a function of a temperature associated with the functional unit; a temperature decoder having an input and an output, the input coupled to the thermal sensor for decoding the temperature signal; a comparator having one input coupled to the decoder for comparing a decoded temperature signal with a predetermined temperature threshold signal coupled to a second input, the comparator enabling a voltage/clock control signal as a function of the decoded temperature signal and the predetermined temperature threshold; an adjustable voltage regulator coupled to the voltage/clock control signal; and a clock selector coupled to the voltage/clock control signal; wherein the voltage regulator and the clock selector are adapted to cooperatively vary the voltage and the frequency of the circuit to a predetermined voltage-frequency pair, responsive to the voltage/clock control signal.

The present invention may be applied to a complex system-on-a-chip to advantageously optimize system and subsystem performance based upon real-time awareness of maximum temperatures at critical nodes. The on-chip thermal sensors at the respective functional units are preferably compatible in design with standard CMOS technology and provide either an analog or digital signal which correlates to the absolute temperature measured by the sensor.

BRIEF DESCRIPTION OF THE DRAWINGS

These and other improvements are set forth in the following detailed description. For a better understanding of the invention with advantages and features, refer to the description and to the drawings wherein:

FIG. 5a shows schematically an overview of an alternative embodiment of the system of FIG. 1 for modifying a switching factor of a circuit;

FIG. 5c depicts a logic flowchart which illustrates additional method steps for modulating the switching factor of a circuit to control heating in the system shown in FIG. 5a.

DETAILED DESCRIPTION

The present invention is directed to an improved thermal feedback system and method for cooperatively varying the voltage and operating frequency of a circuit to control heating while maintaining synchronization. The associated voltage-frequency pairs correspond to a predetermined characterization meeting the circuit's critical timing paths over expected manufacturing and operating variations such as (process, temperature, voltage, and frequency). Current technology trends show an increased demand for and specification of VLSI circuits where the propagation delay of a signal through the circuit has been characterized over ranges of voltages.

The power dissipation ($P_d$) of a CMOS VLSI chip can be stated as $(P_d)=(½)*f*S*C*V^2$ where: f is the clock frequency; V is the voltage swing; C is the total capacitance; and S is the switching factor (or duty cycle). It is assumed that the circuit's inputs are addressed every 1/S clock cycles and that the total chip capacitance C, subject to switching, is constant.

Thus, reducing the voltage swing of the circuit advantageously reduces power dissipation by an amount of the change in voltage squared. A reduction in the voltage also causes an increase in the propagation delay of a signal through the circuit. In order to maintain propagation delays of signals through critical timing paths within specifications and/or avoid undesired transients, the circuit's clock frequency is correspondingly varied with the change in voltage according to the predetermined characterization. Thus, synchronization and reliability issues are avoided.

In a preferred embodiment, the present invention is directed to an improved thermal feedback system and method for cooperatively varying the voltage and operating frequency of a functional unit in a multi-functional unit processor such as a superscalar microprocessor, to control heating. Those skilled in the art will appreciate however, that the present invention can be advantageously applied to many existing data processing systems which incorporate single or multiple CMOS VLSI circuits which perform a particular function (also called functional units) over a significant range of supply voltage. Examples of well known functional units are: fixed-point units, floating point units, load/store units, and branch units found in typical general purpose and superscalar microprocessors. The functional units described herein also include, inter alia, closely-coupled or distributed parallel processors, single or parallel digital signal processors (DSPs), or specialized processors such as microcontrollers and MPEG decoders.

Figure 1:
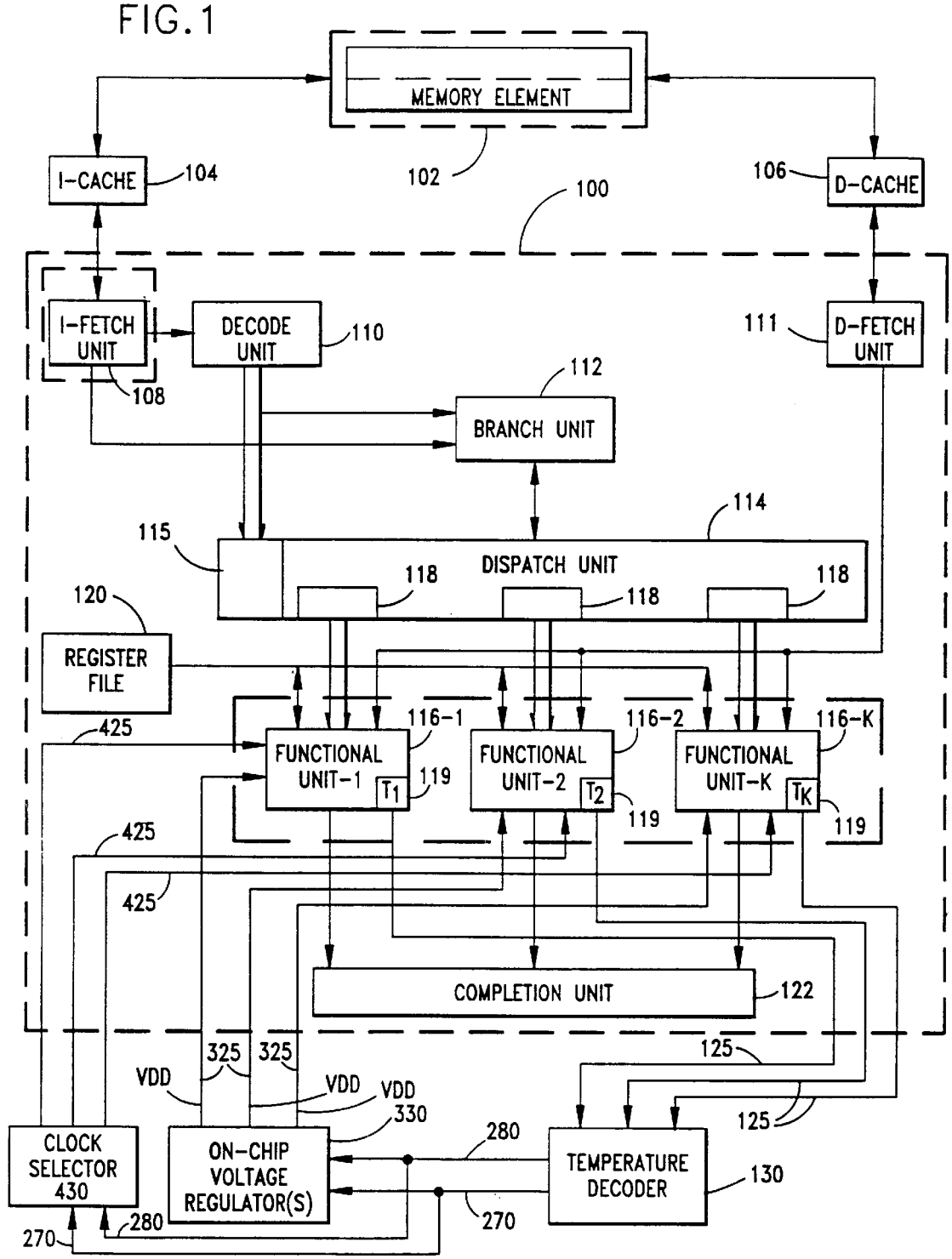
FIG. 1 shows schematically an overview of a preferred embodiment and particularly shows a functional block diagram of a data processing system having features of the present invention.

With reference now to the figures and in particular to FIG. 1, there is depicted a block diagram of a superscalar data processing system having features of the present invention. Superscalar architectures are well known in the art. See, e.g., M. Johnson, "Superscalar Microprocessor Design," Prentice Hall (1991). An exemplary superscalar microprocessor is that sold by the IBM Corporation under the trademark "POWERPC." As is typical in superscalar architectures, a dispatch unit 114 (also called a scheduler or instruction dispatcher) is used to schedule instructions stored in memory elements 102 for execution on functional units 116-1 ... 116-K. Dispatch units are well known in the art. See, e.g., U.S. Pat. No. 5,465,373, issued Nov. 7, 1995, by Kahle et al., entitled "Method and System for Single Cycle Dispatch of Multiple instructions in a Superscalar Processor System," which is herein incorporated by reference in its entirety. The dispatch unit 114 examines the instructions for dependencies prior to dispatching for execution, one to each functional unit.

According to the present invention, each functional unit may have an on-chip thermal sensor 119 which generates an electrical signal 125 representative of the temperature of the associated functional unit. Each functional unit has been characterized over a range of voltages and corresponding clock frequencies wherein each voltage-frequency pair satisfies the worst case propagation delays for critical timing paths. Thus, synchronization and reliability issues are avoided.

The signal 125 from the thermal sensor is provided to a temperature decoder 130 which samples the signal and compares it to a predetermined temperature threshold to determine if the functional unit is overheating. The temperature decoder 130 generates a current/clock control signal 270 as a function of the comparison, e.g., if the threshold has been exceeded or as a function of the temperature relative to a prior sample and/or rate of temperature change. The signal 270 is coupled to the adjustable on-chip voltage regulators 330 to reduce the supply voltage 325. The signal 270 is also coupled to the clock selector 430 to cooperatively modulate the clock frequency sufficiently to maintain system synchronization at the reduced supply voltage. The output 325 of the adjustable voltage regulator 330 is applied to the voltage supply of the functional unit which provided the thermal signal 125. The modulated clock frequency 425 which corresponds to the reduced supply voltage 325 is applied to the clock inputs of the associated functional unit. The reduction in the voltage swing achieves the bulk of the reduction in the functional unit's power dissipation. The clock frequency to the functional unit is correspondingly reduced to that which has been previously characterized to ensure system synchronization at the reduced voltage. The reduction in clock frequency advantageously provides further reductions in power dissipation.

As is typical, the functional units may include a floating point unit, multiple load/store and fixed point units, and a branch execution unit. Thus, the dispatch unit 114 may schedule incoming instructions on an available equivalent functional unit for processing without any reduction in throughput. If an equivalent alternate functional unit is not available, the time to process a fixed size data task may increase. More importantly however, the power dissipation is efficiently reduced by the square of the reduction in the voltage swing. The clock frequency of the functional unit is modulated according to the change in voltage according to the predetermined voltage-frequency characterization of critical timing paths. Thus, potential synchronization and reliability problems are avoided.

Many thermal sensors may be used because future complex VLSI/ULSI chips could have significant temperature gradients across a chip. Thus, a sensor 119, decoder 130, regulator 330, and clock selector 430 may be implemented on-chip and associated with each independently controllable functional unit, which may include thousands to millions of logical gates. Thus, each functional unit may be operating under a different voltage 325 and frequency 425 combination according to the thermal feedback from its associated thermal sensor 119. Using multiple sensors which are tightly coupled to the units they control (via adjustable voltage regulators) provides a higher unit performance without jeopardizing the synchronization or reliability of the whole chip. This represents an optimal combination of cost and performance. It will also admit control settings for lower overall power consumption while allowing high performance locally.

Referring now to FIG. 1 in more detail, the system includes a processor unit 100 and an associated memory unit 102. The memory unit 102 holds program data and instructions to be executed on the processor unit 100. As is conventional, the memory unit 102 is interfaced with an instruction cache unit 104 and a data cache unit 106 to hold frequently used respective instruction and data portions of the memory unit 102. Alternatively, the instruction cache unit 104 and data cache unit 106 may be merged into a single unified cache. The instruction cache 104 and/or data cache units 106 may also comprise multiple caches or multilevel caches, as is also well known. Typically, the instructions/data stored in the instruction cache 104 and data cache 106, respectively, are divided into lines or blocks.

An instruction fetch unit 108 that fetches one or more blocks of instructions stored in the instruction cache 104 into a decode unit 110. The decode unit 110 forwards the branch and condition register update instructions to a branch unit 112 for execution and forwards sequential (non-branch instructions) to a dispatch unit 114. The dispatch unit 114 analyses dependencies among pending instructions, and schedules execution of instructions, one on each of functional units 116-1 through 116-K. The use of such dependencies (also called dependency tags) is also well known in the art. See, e.g., U.S. patent application Ser. No. 377,813, filed Jan. 25, 1995, by Vadem et al., entitled Distributed Completion Control in a Microprocessor, which is hereby incorporated by reference in its entirety.

A D-Fetch unit 118 handles fetching of blocks of data from the data cache 106 into the functional units 116 as needed. The data cache unit 106 holds data values used as source operands by the instructions and some data values generated by executed instructions. Since multiple memory-resident data values may be simultaneously required by the functional units 116 and multiple memory-bound results may be simultaneously generated, the data cache unit 106 is typically multi-ported. The processing unit 100 also includes a register file 120 containing a set of registers. The register file 120 provides operands to the functional units 116 for executing instructions and receives the results of executed instructions. This set is further broken down into an architecturally visible set of registers and architecturally invisible registers. Architecturally visible, or architected registers, refer to the fixed set of registers that are accessible to the assembly level programmer (or compiler) of the machine. Such a register file 120 is well known in the art.

Each functional unit can execute some or all types of instructions. The functional units 116-1 . . . 116-K receive input source operands from and write the output results to the register file 120 and/or the data cache unit 106. For ease of explanation, it is assumed that each of the functional units can execute any instruction. Alternatively, the functional units 116 may be asymmetric, i.e., a specific unit can execute only a certain subset of instructions. Here, the dispatch unit 114 must be aware of this asymmetry and schedule the instructions appropriately.

The processor unit 100 also includes a completion unit 122 which is responsible for completing instruction execution in an order considered valid by the architecture. Although the functional units 116 may execute instructions out-of-order, the processor unit 100 may or may not be allowed to complete the instructions in the same order, depending on the architectural constraints.

The branch unit 112 predicts unresolved branches, and determines the validity of each prediction on branch resolution. The branch unit 112 may also include a condition register for evaluating the outcome of conditional branches, and logic that updates the condition register according to the results of operations performed by the functional units 116.

As is conventional, the dispatch unit 114 includes an instruction buffer 115 for storing the decoded instructions forwarded from the decode unit 110. Instructions in the buffer 115 are typically analyzed for dependencies by the dispatch unit 114. All instructions received by the dispatch unit 114 in the same cycle may be assumed to be independent. The dispatch unit 114 schedules the instructions for execution on an appropriate functional unit 116-1 through 116-K when all dependencies are met. Exemplary dependencies may be: a functional unit's busy status; whether destination registers are available; whether the instruction is valid; whether completion unit 122 buffers are available; and whether there are any resource conflicts. When all dependencies are resolved, the dispatch unit 114 may latch the instructions into reservation stations 118 or execution input latches at the inputs of the selected functional unit 116-1 through 116-K. Reservation stations are well known in the art. See, e.g., M. Johnson, Superscalar Microprocessor Design, Prentice Hall (1991) (pp 45–48, pp. 127–146). Reservation stations are also used in the microprocessor sold by the Intel Corporation under the trademark "Pentium." Those skilled in the art will appreciate that although only a single dispatch unit 114 and scheduler 117 is shown in this embodiment, multiple schedulers and/or dispatch units could be used within the spirit and scope of the present invention.

According to the present invention, each functional unit 116-1 . . . 116-K may include an on-chip thermal sensor 119 mechanism. The thermal sensor 119 may comprise a current-controlled CMOS ring oscillator which sends out a square wave signal whose frequency is an inverse function of temperature. See, e.g., S. Boyle, R. Heald, "A CMOS Circuit for Real-Time Chip Temperature Measurement," PROCEEDINGS of COMPCON '94, San Francisco, Calif., March, 1994, pp. 286–291; which is hereby incorporated by reference in its entirety. The thermal sensor 119 output may be periodically sampled by temperature decoder 130 (described in FIG. 2) via signal paths 125. The decoder 130 decodes and compares the thermal sensor output with a predetermined threshold to provide current/clock control signals 270 respectively to an adjustable on-chip voltage regulator 330 (described in FIG. 3) and to a clock selector 430 (described in FIG. 4). The signals 270 operate to control the current sources to voltage regulator 330 to adjust the regulator output voltage 325. The signals 270 also operate to select a predetermined corresponding clock frequency via clock selector 430. The resulting voltage-frequency pair, which has been previously identified to maintain known critical timing paths within design specifications, is coupled via paths 325 and 425 respectively to the functional unit providing the thermal sensor output 125.

A variety of alternative on-chip thermal sensors are well known in the art. A typical thermal sensor measures the forward voltage of a temperature-characterized on-chip diode. Many thermal sensors capable of generating either digital or analog signals may be used as the thermal sensor 119 mechanism of the present invention to achieve substantially the same results. All such variations are included within the spirit and scope of the present invention. Those skilled in the art will also appreciate that the present invention may be applied to any of the functional logic blocks such as are shown FIG. 1, either individually or in common.

Figure 2:
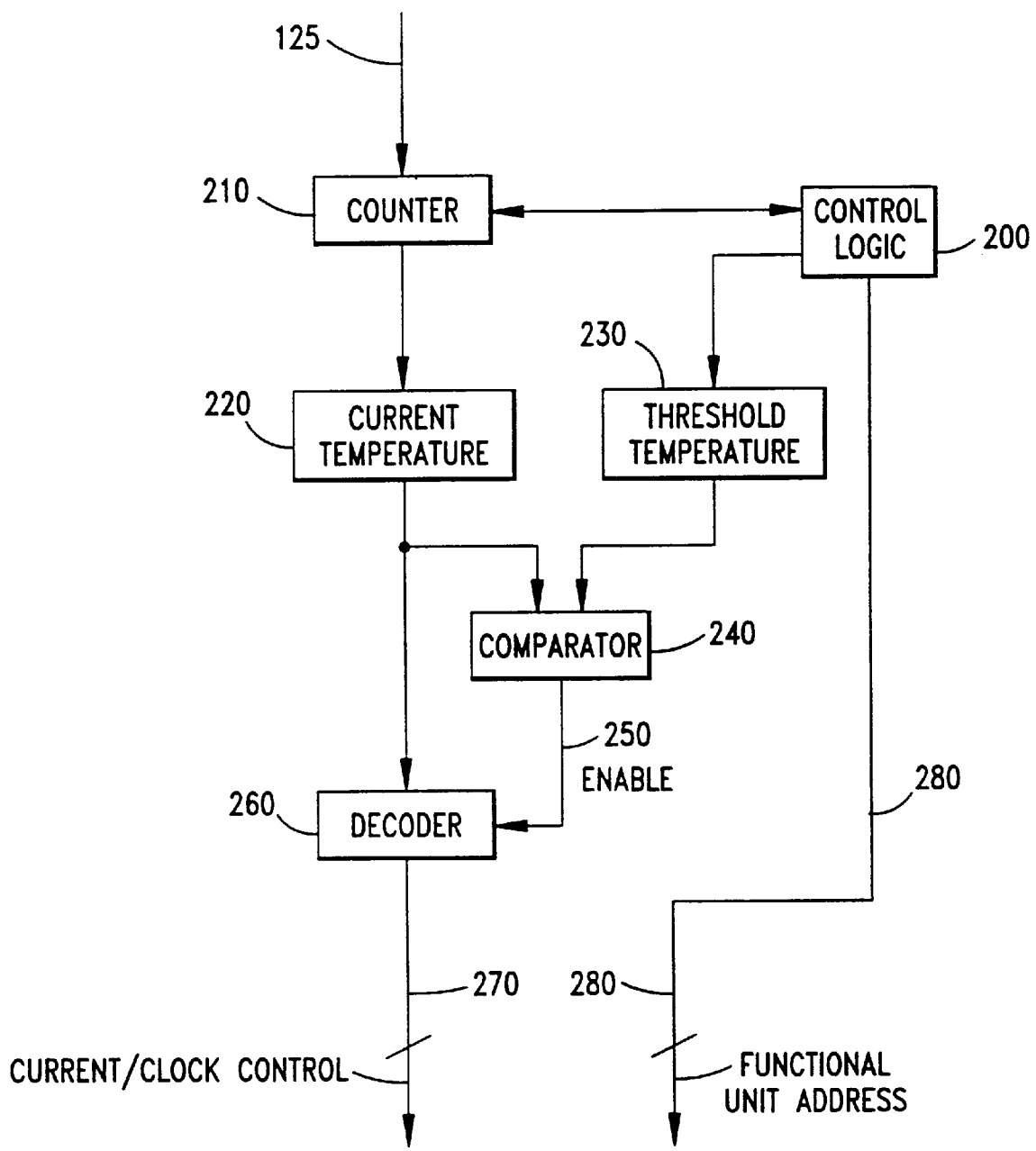
FIG. 2 shows more details of the temperature decoder block of FIG. 1.

FIG. 2 illustrates an example of the temperature decoder 130. Control logic 200 may periodically and sequentially select or latch a feedback path 125 to one of the thermal sensors 119 thus coupling the ring oscillator frequency of the associated sensor 119 to counter 210. Here, the ring oscillator frequency is inversely proportional to temperature. The sampling can be done sequentially or in parallel within the scope of the present invention. Knowing the nature of each functional unit, chip layout, and associated data, one skilled in the art could further modify the control logic 200 to control the method and rate of sampling as a function thereof. Counter 210 translates the sampled frequency into a digital signal 220 representing the current operating temperature of the sampled functional unit. Temperature decoder 130 may include logic which complements the count obtained by counter 210 to produce a count which is directly proportional to the sensed temperature. Control logic 200 also outputs a predetermined digital signal 230 representing the threshold temperature for the sampled functional unit. The predetermined digital signal 230 value could be hard-wired into the temperature decoder or stored to and accessed from a register such as register file 120 by means well known in the art. Both digital signals 220 and 230 may be fed into a comparator 240 which outputs an enable signal 250 to decoder 260 as a function of the inputs, e.g., if the signal 220 exceeds (or approaches) threshold temperature 230. Upon receiving enable signal 250, decoder 260 converts signal 220 to a series of current/clock control signals 270 which are latched respectively to the adjustable voltage regulator 330 and clock selector 430. The control logic 200 also outputs an associated functional unit address 280 for the sampled functional unit along with signal 270. The signal 270 is latched according to the address 280 to the voltage regulator 330 and clock selector 430 which in turn output a predetermined voltage-frequency pair to control the power dissipated at the sampled functional unit. This feedback process (assuming a fixed delay) will continue until the voltage-frequency combination is reduced to a minimal functional level.

Figure 3:
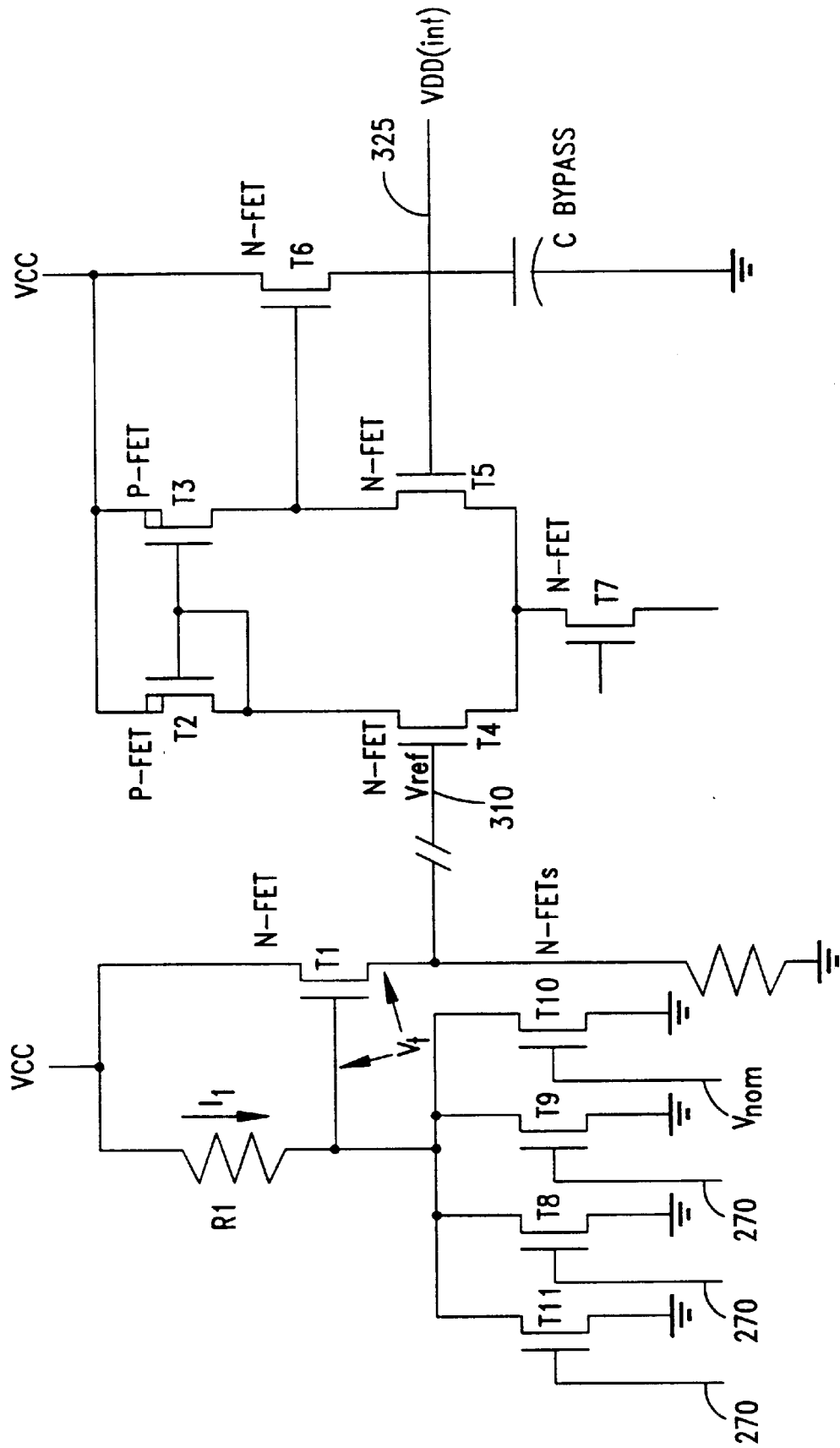
FIG. 3 shows more details of the current controlled adjustable on-chip voltage regulator block of FIG. 1.

FIG. 3 shows an example of one of the adjustable on-chip voltage regulators 330 having features of the present invention. In general, the voltage Vref 310, at a high impedance node is transformed by the circuit to be the effective same voltage at output node 325. Thus, VDD 325 becomes a voltage source of low impedance which can be used to power a relatively large number of CMOS circuits. Voltage regulators of the type having a fixed Vref are well known in the art. See for example U.S. Pat. No. 5,162,668, issued Nov. 10, 1992, by Chen et al., entitled "Small Dropout On-chip Voltage Regulators with Boosted Power Supply," which is hereby incorporated by reference in its entirety.

According to the present invention, the output 325 is made adjustable by varying Vref 310 which is given by, $$Vref=VCC-(I1*R1)-V_t(T1).$$

During normal operating conditions, the current/clock control signal 270 and functional-unit address 280 are latched at a default (power-up) state. Here, current sources T8, T9 and T11 are off and the value of Vref is, $$VCC-(R1*I(T10))-V_t(T1),$$

as T10 is always on, biased-on by Vnom and where $V_t$ represents the voltage drop across the gate and source of T1. As noted above, the control logic 200 periodically samples the temperature 125 at each functional unit and outputs an associated functional unit address 280 for the sampled functional unit. The signal 270 is latched according to the address 280 to an adjustable voltage regulator 330 (one shown in FIG. 3) whose output 325 acts as the voltage source for the sampled functional unit. It is assumed in this sampling period that the signal 125 is decoded by temperature decoder 130 as indicating an overheating functional unit. The current/clock control signal 270 is then latched according to address 280 to enable one or more of T8, T9, and T11. The-value of Vref becomes, $$VCC-R1*I(T10+T1+\ldots)-V_t(T1),$$

depending on which devices were turned on. Hence, the full range of Vref variation would be determined by the number of current sources connected to node A, how many were enabled, their respective current value and the value of the resistor, R1. Those skilled in the art will appreciate that where an equivalent functional unit is available, that dispatch unit may simply schedule additional work on the equivalent functional unit. Thus, overall throughput may not be impacted. Even where the net result is a longer time to complete the task, the chip more importantly remains within the allowable temperature range.

The present invention is particularly well suited for application to CMOS and similar circuits which will operate over a significant range of applied voltage, hence resulting in a range in performance and significant variation of power dissipation.

Figure 4:
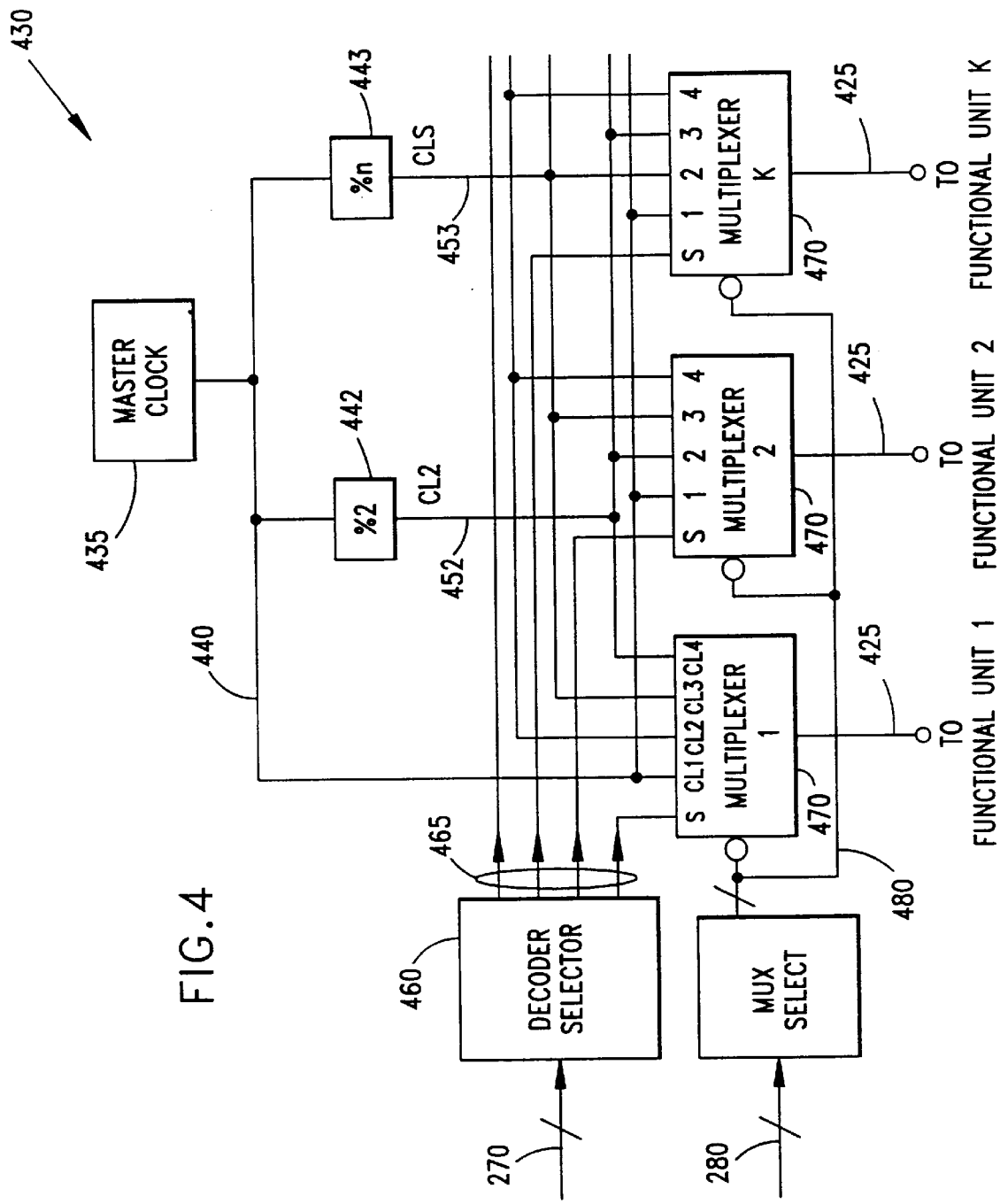
FIG. 4 shows more details of the clock selector block of FIG. 1.

FIG. 4 shows an example of the clock selector 430. As depicted, a master clock 435 running at a master clock frequency 440 which is used as the common source and provides a common clock reference for a number of clock dividers whose output is some predetermined fraction of the master clock frequency 440. Thus, clock divider 442 may be a divide-by-two clock divider whose output frequency 452 is one-half that of the master clock frequency 440, and clock divider 443 may be divide-by-n clock divider whose output frequency 453 is one-nth that of the master clock frequency 440. Each of the clock dividers outputs are coupled to the inputs of K multiplexers 470 where K is the number of thermal sensors 119.

The clock selector includes a decoder 460 which receives signal 270 associated with a particular functional unit via its thermal sensor 119 and the temperature decoder 130. The decoder 460 decodes the signal 270 and outputs a clock select signal 465 to a select input (S) to the multiplexer associated with the particular functional unit. The clock select signal 465 is used to select the clock frequency corresponding to the voltage output by voltage regulator 330 according to signal 270. The clock selector also includes a multiplexor selector which selects and latches signal 465 into the appropriate multiplexor 470 according to functional unit address 280. Recall that the technology associated with each functional unit has been characterized at a series of voltage-frequency pairs which satisfy critical timing paths over expected manufacturing process and operating conditions. Each multiplexer 470 outputs the selected clock frequency which is coupled to the particular functional unit via the appropriate one of paths 425.

Referring again to FIG. 1, the temperature decoder 130 may continue periodically sampling the functional units 116-1 through 116-K. The sampling rate may be several orders of magnitude slower than the clock frequency. As long as the sampled temperature exceeds the predetermined threshold temperature 230, the on-chip voltage.regulators 330 and clock selector 430 (voltage-frequency pair) will modulate the voltage 325 and corresponding clock frequency 425 respectively to control the heat generated by the associated functional unit while maintaining synchronization and reliability. If the temperature continues to increase, the voltage-frequency pair again may be reduced to lower power dissipation. Those skilled in the art will also appreciate that the particular sampling rate can also be varied according to the needs of the particular architecture and could be at any rate, or even continuous.

As a result of the thermal feedback, the voltage regulators 330 and clock selector 430 modulate the voltage 325 and frequency 425 until the temperature of the overheating functional unit drops below the threshold temperature 230. The temperature decoder 130 subsequently selects the feedback path 125 associated with the previously overheating functional unit and the ring oscillator frequency of the associated sensor 119 is coupled to counter 210. The counter 210 translates the sampled frequency into a digital signal 220 representing the current operating temperature of the sampled functional unit. The control logic 200 also outputs the predetermined digital signal 230 representing the threshold temperature for the sampled functional unit. Both digital signals 220 and 230 are coupled to the comparator 240 which outputs an enable signal 250 to decoder 260 when the signal 220 exceeds threshold temperature 230. Here, the reduced voltage has reduced the power dissipated so that signal 220 is now less than the threshold temperature 230. The temperature decoder 130 may then output the functional unit address 280 and the current/clock control signal 270 to disable one or more of T8, T9, and T11, which increases Vref 310 and thus VDD 325. The current/clock control signal 270 is also coupled to the decoder 460 which decodes the signal 270 and outputs a clock select signal 465 to a select input (S) to the multiplexer associated with the particular functional unit. The clock select signal 465 is used to select the clock frequency corresponding to the increased Vref voltage output by voltage regulator 330 according to signal 270. The multiplexer 470 selected according to the generated address 280 latches the selected clock frequency which is coupled to the particular functional unit via the respective one of paths 425.

Those skilled in the art will appreciate that within the scope of the present invention, the multi-functional processor need not be incorporated on a single chip. For example, the processor could be a distributed parallel processor such as is sold by the IBM Corporation under the trademark "SP2". In this case, a scheduler managing the partitioning and allocation of a job in the parallel environment may communicate current/clock control signal 270 and functional unit address 280 to reduce the voltage-frequency pair to an overheating distributed parallel processor node in response to a message received from a thermal sensor incorporated on the overheating node.

In another embodiment according to the present invention, one can consider real-time data processing on a number of parallel digital signal processors (DSPs), e.g, for an image recognition application. Thermal feedback to a temperature decoder and adjustable voltage regulator/clock selector reduces the voltage-frequency pair to one or more overheating DSP's (functional units). Assuming the DSPs are functional equivalents, the remaining processors may be allocated a greater percentage of the processing task. More importantly, even where the net result is a longer time to complete the task, the chip remains within the allowable temperature range. Again note that the present invention does not preclude an increase in the clock frequency, e.g., to the remaining processors to optimize overall system throughput.

In yet another embodiment, a processor macro or DSP macro may contain a 'hardware assist' macro which performs a set of instructions much faster than the general processor, because it is optimized to perform that specific task. In this case, the general processor can also perform the same task, but slower. Here again, within the scope of the present invention, when the chip or chip quadrant containing the processor macro or DSP macro becomes too hot, the voltage-frequency pair applied to the 'hardware assist' macro may be reduced to slow it down and cool it while the general processor performs related tasks. In net, overall throughput may be reduced, but more importantly, the chip's power dissipation is reduced.

Figure 5B:
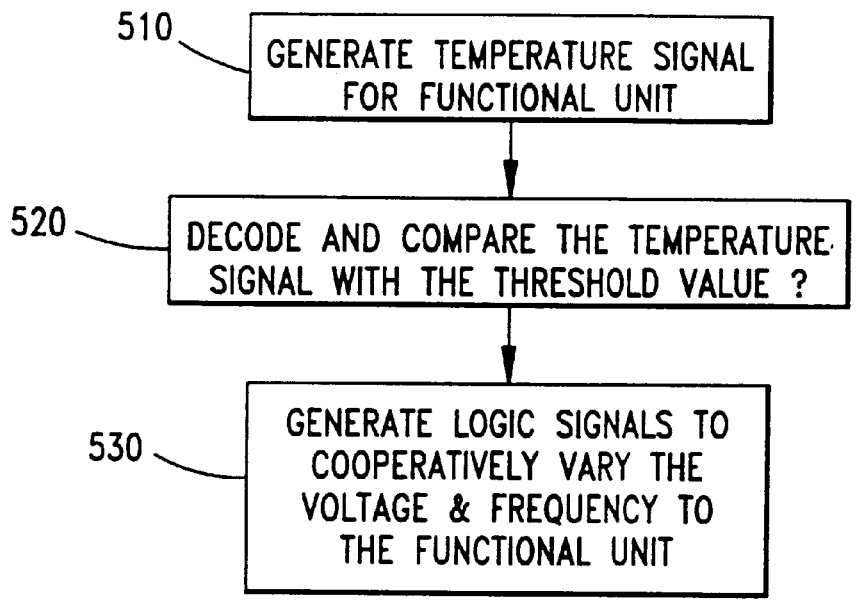
FIG. 5b depicts a logic flowchart which illustrates a method in accordance with the system of the present invention.

FIG. 5b depicts a logic flowchart which illustrates a method for cooperatively modulating the voltage and frequency applied to a circuit such as a functional unit of a processor in accordance with the system of the present invention. As depicted, the process begins at step 510 wherein a thermal sensor associated with a functional unit generates a temperature signal which is a function of a temperature at the functional unit. In step 520, the signal is decoded and compared to a predetermined threshold temperature and control passes to step 530. In step 530, a current/clock control signal is generated, as a function of the comparison, which may be used to cooperatively vary the voltage and frequency of the functional unit to a predetermined voltage-frequency pair which controls power dissipation while satisfying identified critical timing paths for the functional unit. For example, if the current temperature exceeds the threshold temperature, the voltage and frequency of the appropriate functional unit are reduced to control the power dissipated. Alternately, the temperature signal could be compared to the signal generated during a prior sampling period or periods and output a corresponding current/clock control signal as a function of the threshold and/or the relationship between the current and prior temperature signals. Examples are: if the temperature is increasing or decreasing and/or its proximity and/or prior relationship to the threshold and/or the current temperature is less than for a previous sampling. Thus, the modulated voltage and frequency are applied to the functional unit to dynamically control heating while maintaining synchronization and reliability.

In order to achieve the above advantages, the thermal sensors and the functional units should be design compatible with standard CMOS technology. The thermal sensors may provide either an analog or digital signal which correlates to the absolute temperature measured by the sensor.

Additional steps can be taken to advantageously use the thermal feedback to vary the switching factor (or duty cycle) of a functional unit and thus control the power dissipated by an overheating functional unit. The switching factor as described herein refers to the fact that due to gating requirements, latency and data transfer characteristics, the rate at which a given circuit's inputs are addressed is some or fraction of the system clock frequency. Additional modulation of the circuit's clock frequency is not required and thus potential synchronization issues are advantageously avoided. An example of such a method and system can be seen in the aforementioned U.S. patent application Ser. No. 08/639,396 entitled "Performance-temperature Optimization by Modulating the Switching Factor of a Circuit, IBM docket number YO996-024, now U.S. Pat. No. 5,798,918 filed of even date herewith by the inventors hereof and assigned to the same assignee herein, and incorporated herein by reference in its entirety. The switching factor of a circuit as referred to herein is the fraction of clock cycles that a circuit is addressed and hence when most of its power is dissipated as heat (due to the charging and discharging the load and internal capacitances on any internal and external circuits).

Figure 5C:
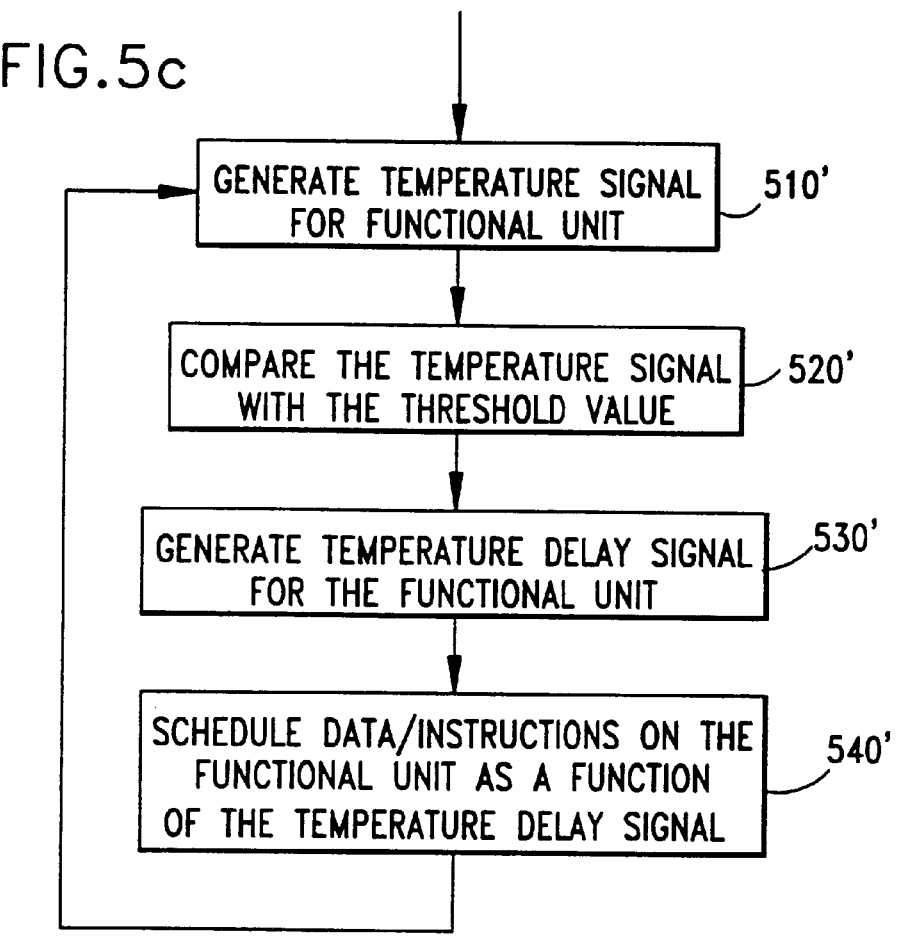

FIG. 5c depicts a logic flowchart of a method for modulating the switching factor of a functional unit and will be described with reference to a system having features of the present invention, shown in FIG. 5a. As depicted, the process begins at step 510' wherein a thermal sensor 119 associated with one of functional units 116-1 . . . 116-K generates a signal 125 which is a function of a temperature at the functional unit. In step 520', the signal 125 is compared to a predetermined threshold and control passes to step 530'. In step 530', as a function of the comparison, e.g., the signal exceeds the threshold, the temperature decoder 130 may generate a delay signal 135 to the dispatch unit 114'. The delay signal 135 includes an address of the relevant functional unit and a new dependency to be used by the dispatch unit for modulating the circuit switching factor (S), or duty cycle, of the associated functional unit. Alternatively, the delay signal could be hardwired to the relevant functional unit. The signal 125 could alternatively be compared to the signal 125 generated during a prior sampling period or periods and the delay signal 135 be generated as a function of the threshold and/or the relationship between a sequence of temperature signals. For example, if the temperature is increasing or decreasing and/or its proximity and/or prior relationship to the threshold 230. For example, if the temperature signal is less than the threshold and/or is less than for a previous sampling. In step 540', the dispatch unit 114' examines the instructions for dependencies, including the new switching factor dependency, prior to scheduling the instructions for execution, one to each functional unit. The dispatch unit 114' detects the delay signal 135 and reduces the instruction dispatch rate (the switching factor) to the overheating functional unit according to the signal 135. Alternatively, subsequent instructions can be scheduled on an available equivalent functional unit for processing without any reduction in throughput. In the case where the temperature threshold 230 is not exceeded or being approached, then delay signal 135 will be provided to the dispatch unit to indicate that instructions may be scheduled for immediate execution on the appropriate functional unit, subject to any other dependencies.

Next, the process iterates and the dispatch unit 114' continues to modulate the switching factor of the functional unit(s) based on the thermal feedback. If the functional unit which was previously overheating as indicated by step 530, cools to acceptable levels (the temperature delay signal no longer exceeds or approaches the threshold value) the dispatch unit may increase the rate at which instructions are scheduled (the switching factor) to the functional unit. Alternately, the functional unit could be maintained at the lower switching factor until the temperature signal becomes less than (or approaches) a second predetermined threshold which represented a lower temperature than threshold temperature 230. These features of the present invention efficiently and directly reduce the power dissipation for the fraction of cycles that the functional unit's inputs are addressed.

While we have described our preferred embodiments of our invention, it will be understood that those skilled in the art, both now and in the future, may make various improvements and enhancements which fall within the scope of the appended claims. Accordingly, these claims should be construed to maintain the proper protection for the invention first disclosed.

We claim:

1. A method of using thermal feedback to cooperatively vary a voltage and a frequency applied to a synchronous circuit to control heating while maintaining synchronization, said method comprising the steps of:

characterizing said circuit over a range of voltages and corresponding clock frequencies, and generating one or more voltage-frequency pairs capable of satisfying worst case propagation delays for critical timing paths in said circuit;

generating a temperature signal which is a function of a temperature associated with the circuit;

comparing the temperature signal with a predetermined temperature threshold signal; and cooperatively varying the voltage and the frequency of the circuit to a predetermined voltage-frequency pair, responsive to said step of comparing, whereby the voltage-frequency pair is selected according to said characterization of said critical timing paths.

2. A method of using thermal feedback to cooperatively vary a voltage and a frequency applied to a synchronous circuit to control heating while maintaining synchronization, wherein the circuit comprises a plurality of functional units for processing data in a data processing system, the method comprising the steps of:

characterizing each said functional unit over a range of voltages and corresponding clock frequencies, and generating one or more voltage-freauency pairs associated with the functional unit capable of satisfying worst case propagation delays for critical timing paths in said circuit;

generating a temperature signal for a functional unit, the temperature signal being a function of a temperature associated with the functional unit;

identifying the functional unit associated with the temperature signal, responsive to said generating step;

comparing the temperature signal with a predetermined temperature threshold signal; and cooperatively varying the voltage and the frequency of the functional unit to a predetermined voltage-frequency pair, responsive to said step of comparing, whereby the voltage-frequency pair is selected according to said characterization of said critical timing paths.

* * * * *